United States Patent
Montillier

[11] 3,849,130
[45] Nov. 19, 1974

[54] ORGANIC PHOTOCONDUCTIVE COMPOSITION AND ELECTROPHOTOGRAPHIC MEMBER

[75] Inventor: Jean-Pierre Montillier, Manchester, Conn.

[73] Assignee: Pitney-Bowes, Inc., Stamford, Conn.

[22] Filed: Dec. 1, 1972

[21] Appl. No.: 311,222

Related U.S. Application Data

[63] Continuation-in-part of Ser. No. 236,196, March 20, 1972, abandoned, and a continuation-in-part of Ser. No. 260,972, June 8, 1972, abandoned.

[52] U.S. Cl. .................. 96/1.5, 96/1.8, 252/501
[51] Int. Cl. ............................................ G03g 5/10
[58] Field of Search ................. 252/501; 96/1.5, 1.8

[56] References Cited
UNITED STATES PATENTS

| | | | |
|---|---|---|---|
| 3,113,022 | 12/1963 | Cassiers et al. | 96/1.5 |
| 3,287,120 | 11/1966 | Hoegl | 96/1.5 |
| 3,484,237 | 12/1969 | Shattuck et al. | 96/1.5 |
| 3,655,378 | 4/1972 | Contois et al. | 96/1.5 |
| 3,661,879 | 5/1972 | Van Dam et al. | 96/1.5 |
| 3,666,458 | 5/1972 | Arneth et al. | 96/1.5 |
| 3,684,506 | 8/1972 | Guarnaccio | 96/1.5 |

*Primary Examiner*—Ronald H. Smith
*Assistant Examiner*—John L. Goodrow
*Attorney, Agent, or Firm*—William D. Soltow, Jr.; Albert W. Scribner; Peter Vrahotes

[57] ABSTRACT

There are disclosed photoconductive insulating compositions and electrophotographic members utilizing such composition which are transfer complexes of a Lewis acid, preferably 2, 4, 7-trinitro-9-fluorenone or 2, 4, 5, 7-tetranitro-9-fluoroenone combined with a dicarbazolyl compound characterized by the formula:

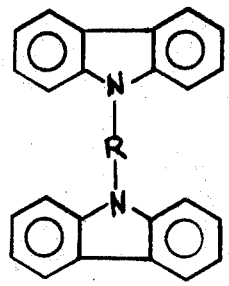

wherein R is a member selected from the group consisting of aryls, alkyls, and cycloalkyls, preferably discarbazolyl cyclobutane, and combined with a vinyl heterocyclic aromatic polymer or a vinyl polynuclear aromatic polymer which is believed to act both as a binder and a photoconductor in the combination. The preferred polymer is either a poly-N-vinyl carbazole or a halogenated poly-N-vinyl carbazole having a molecular weight high enough to impart high viscosity to the composition. The mole ratio of discarbazolyl compound to Lewis acid is from 1:0.5 to 1:5 and preferably from 1:2 to 1:5. At mole ratios above 1:2 increased electrophotographic speed is attained.

8 Claims, No Drawings

ORGANIC PHOTOCONDUCTIVE COMPOSITION AND ELECTROPHOTOGRAPHIC MEMBER

RELATED APPLICATIONS

This application is a continuation-in-part of my copending applications Ser. No. 236,196 filed Mar. 20, 1972 now abandoned and Ser. No. 260,972 filed June 8, 1972 both cases now abandoned.

BACKGROUND OF THE INVENTION

Photoconductive insulating compositions have found widespread use in electrophotography, but may also be used for any device requiring a photoconductor such as photoelectric cells, television receiver tubes, and other photoelectric components such as resistors or the like. In electrophotography a number of organic compositions have been disclosed in the prior art. As an example it is disclosed in U.S. Pat. No. 3,162,532 that at least one mono-vinyl aromatic polynuclear hydrocarbon may be used along with dyestuff sensitizers and/or activators. It is also known that constituents of these aromatic vinyl compounds may be electron-releasing such as alkyl groups, e.g. methyl, ethyl, propyl, isobutyl, and amyl; alkoxy groups, e.g. methoxy, ethoxy, propoxy, and butoxy; dialkylamino groups, such as dimethylamino, diethylamino, dipropylaminoo, and dibutylamino; hydroxyl groups esterified with carboxylic acids such as acetic acid, and propionic acid, free hydroxyl groups and amino groups. Dialkylamino groups are particularly useful. Suitable copolymerizates have also been used and are those of the above aromatic vinyl compounds copolymerized with each other or with other compounds having polymerizable double bonds such as acenaphthylene, preferably with mono-nuclear aromatic vinyl compounds, e.g. styrene and methyl styrene.

The following polynuclear aromatic vinyl compounds are exemplary of the prior art: vinylnaphthalenes, such as 1-vinylnaphthalene, and 2-vinylnaphthalene; vinylanthracenes, such as 1-vinylanthracene, and 9-vinylanthracene; vinyldiphenyls, such as 4-vinyldiphenyl, and 3-vinyldiphenyl; vinyl fluorenes, such as 2-vinylfluorene; vinylacenaphthenes, such as 5-vinylacenaphthene, vinylphenanthrenes, such as 2-vinylphenanthrene, and 3-vinylphenanthrene; vinylpyrenes, such as 3-vinylpyrene; vinylnaphthacenes, such as 2-vinylnaphthacene; vinylperylenes, such as 3-vinylperylene, 6-methoxy-2-vinyl-naphthalene, 1-methoxy-2-vinyl-naphthalene, 4-methoxy-1-naphthalene, 6-methoxy-1-vinyl-naphthalene; 9-vinyl-10-methyl-anthracene, 9-vinyl-10-ehtyl-anthracene, and 6-acetoxy-2-vinyl-naphthalene.

U.S. Pat. No. 3,037,861 discloses the use of a solid polyvinyl carbazole as a photoconductor. It is further disclosed that additives such as dyestuff sensitizers in the proportion of 0.1 to 5 percent by weight of photoconductor may also be used.

It is disclosed that even with the addition of 1 to 2 percent of a sensitizer or activator as indicated in U.S. Pat. No. 3,037,861 above, the sensitivity of exposure speed of a polyvinyl carbazole photoconductive composition will still be about 14 times slower than the exposure speed of amorphous selenium now widely used in xerography, depending upon the particular activator used. Further, British Patent No. 990,368 states that the amount of activator in such systems must be limited to less than 100 moles of activator to 1000 moles of photoconductor to keep the dark conductivity of the composition at a sufficiently low level in order for the composition to accept an electrostatic charge which will make it useful in electrophotography.

U.S. Pat. No. 3,484,237 discloses the use of an organic photoconductive composition comprising 2, 4, 7-trinitro-9-fluorenone and a polymer of one or more vinyl heterocyclic compounds, in the proportions of 0.49 to 1.23 moles of 2, 4, 7-trinitro-9-fluorenone to 1.0 mole of monomeric unit of vinyl heterocyclic compound.

Other prior art includes U.S. Pat. No. 3,684,506 wherein dicarbazolyl cyclobutane is used as a photoconductor with 0.005 to 1 percent of an electron acceptor to increase the sensitivity of the composition. German Patent No. 2,126,660 discloses the combination of halogenated poly-N-vinyl carbazole and a number of electron acceptors as a photoconductor.

Still other prior art patents disclosing the use of carbazolyl compounds or of polyvinyl carbazole are U.S. Pat. Nos. 3,287,119, 3,159,483, 3,399,060 and 3,607,258. It is disclosed in U.S. Pat. No. 3,287,119 that 2, 4, 7-trinitro-9-fluorenone or 2, 4, 5, 7-tetranitro-9-fluorenone may be used as an electron acceptor. Use of 2, 4, 7-trinitro-9-fluorenone as an electron acceptor is also disclosed in Pat. No. 3,607,258.

Organic photoconductors of the above type have a sufficiently low dark conductivity to be suited for use in electrophotography. Further, these photoconductors absorb in the visible region of the spectrum so that the additional dyestuff sensitizers may not be necessary and these compounds have good chemical stability. Further, with the use of a proper exposure source, compositions of the above formulations may have an exposure speed which is comparable with that of amorphous selenium.

A problem arises, however, when a concentration of 2, 4, 7-trinitro-9-fluorenone increases with respect to the amount of polymerized vinyl carbazole. Particularly, when the mole ratio of 2, 4, 7-trinitro-9-fluorenone to the polymerized carbazole compound is in excess of 1:1 some of these compositions become crystalline and accordingly, lose some of their electrophotographic speed. The negative charge acceptance of these compounds and sensitivity thereof will increase with increasing proportions of fluorenone, but the 2, 4, 7-trinitro-9-fluorenone cannot be effectively used in amounts greater than that which begins to result of crystallization of the complex. Accordingly, heretofore, the speeds of such photoconductive compositions have been limited by the ratio of trinitrofluorenone to the polymerized vinylcarbazole compound.

It has also been found that the preparation of photoconductive coating of polyvinyl carbazole and trinitrofluorenone requires substantial processing time in that the complete dissolution of the polymerized vinylcarbazole in a solvent such as tetrahydrofuran, benzene, toluene, dioxane or dichloromethane, may require up to several hours. In addition, the trinitrofluorenone must then be mixed into the polymer solution for from about 30 minutes to more than an hour. Such extended processing time results in increased production costs for such organic photoconductor systems.

SUMMARY OF THE INVENTION

This invention relates to a three component photoconductive insulating composition of dicarbazolyl cyclobutane, 2, 4, 7-trinitro-9-fluorenone and poly-N-vinyl carbazole which provides a synergistic effect which is greater than additive for each of the components when used alone as a photoconductive composition. The electrophotographic speed of the composition is as good or better than that used in present commercial xerographic machines. Further, the processing time for the making of such a photoconductive composition is very substantially reduced from that required for making known two component systems with these constituents.

In accordance with the present invention the photoconductive insulating composition is a charge transfer complex resulting from a combination of a Lewis acid, preferably 2, 4, 7-trinitro-9-fluorenone or 2, 4, 5, 7-tetranitro-9-fluorenone with a dicarbazolyl compound characterized by the following formula:

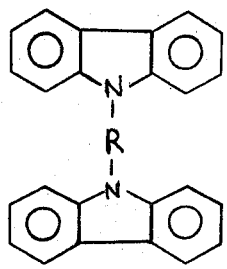

wherein R is a member selected from the group consisting of aryls, alkyls and cycloalkyls, and preferably dicarbazolyl cyclobutane with a mole ratio of dicarbazolyl compound to Lewis acid being from about 1:0.5 to 1:5, preferably from 1:2 to 1:5. The Lewis acid-dicarbazolyl complex is combined with from 5 to 50 percent by weight of a vinyl heterocyclic aromatic polymer or a polyvinyl nuclear aromatic polymer, preferably poly-N-vinyl carbazole or halogenated poly-N-vinyl carbazole having a molecular weight high enougn to impart sufficient viscosity to the three component composition for the preparation of photoconductive coatings. It has further been found that when the mole ratio of dicarbazolyl compound to trinitrofluorenone exceeds 1:2 that the electrophotographic speed of the composition increases substantially, further increasing as the mole ratio approaches 1:5. Thus the three component photoconductive electrically insulating composition of the invention is capable of being compounded faster and more easily than prior art organic photoconductors since the dicarbazolyl compound is very soluble in conventional solvents. Further, since crystallization of the composition is avoided by the instant invention, higher curing temperatures may be employed without the risk of loss of electrophotographic speed.

While dye sensitizers may also be used, the composition is a highly colored dark brown and for most applications sensitizing dyes are not required.

DETAILED DESCRIPTION OF THE PREFERRED EMBODIMENTS

The photoconductive insulating composition of the invention is particularly useful for use in electrophotographic processing, but the composition may also be used in any application where its photoconductive properties are desired, such as, for example, in photocells, imaging displays, light sensitive scanners and the like. The electrophotographic sheet made with the photoconductive insulating composition of the invention comprises an electrically conductive substrate such as aluminized Mylar with a thin coating of a photoconductive composition of a thickness of from about 5 to 25 microns applied thereto.

The composition of the invention comprises an electron donor which is a dicarbazolyl compound of the formula:

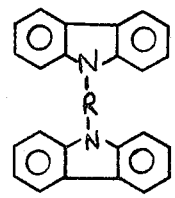

wherein R is a member selected from the group consisting of aryls, alkyls and cycloalkyls, and preferably dicarbazolyl cyclobutane of any isomeric configuration such as 1, 2-dicarbazolyl cyclobutane of the formula:

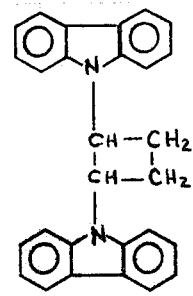

which forms a charge transfer complex with an electron acceptor being a suitable Lewis acid, preferably 2, 4, 7-trinitro-9-fluorenone or 2, 4, 5, 7-tetranitro-9-fluorenone. The dicarbazolyl compound and the electron acceptor are then intermixed with the polymeric material of this invention.

The polymeric material may be any donor-type polymer capable of forming a charge transfer complex with the electron acceptor, such as a polymeric amine, a vinyl heterocyclic aromatic polymer or a vinyl polynuclear aromatic polymer and preferably is poly-N-vinyl carbazole and/or a halogenated poly-N-vinyl carbazole. The amount of binder may be from about 5 to 50 percent of the composition by weight of solids and preferably from 5 to 20 percent by weight.

The polymeric binder must be of sufficiently high molecular weight to impart viscosity to the composition for coating purposes. With the use of binders such as poly-N-vinyl carbazole in an amount of around 8 to 10 percent by weight it is found that a molecular weight of at least 500,000 should be used to impart the proper viscosity to the composition to facilitate coating.

The three non or poorly photoconductive components of the composition of the invention interact to result in a photoconductive insulating composition which is synergistic in providing an amorphous composition having electrophotographic speeds of commercial application. In the use of a photoconductive composition consisting of poly-N-vinyl carbazole with 2, 4, 7-trinitro-9-fluorenone, a mole ratio of more than 1:1.23 as set forth in U.S. Pat. No. 3,484,237 will result in crystallization with a resulting substantial loss in electrophotographic speed for the composition. With mole ratios as low as 1:1, curing may also cause crystallization of the composition.

For convenience, the following designations will be used herein: dicarbazolyl cyclobutane = DCC; 2, 4, 7-trinitro-9-fluorenone = TNF; poly-N-vinyl carbazole = NVK.

I have found that in a three component photoconductive composition of DCC, TNF and NVK that mole ratios of from 1:1.5 to 1:5 DCC to TNF can be formed not only without experiencing crystallization, but when the mole ratio exceeds 1:2 there is a substantial increase in electrophotographic speed up to about a mole ratio of 1:5. It appears that the fastest electrophotographic speed is attained at a mole ratio of DCC to TNF of about 1:3.5 to 1:5, with the NVK making up about 5 to 13 percent of the composition by weight.

The DCC may be synthesized by the following process which is a modification of the basic process disclosed by Shirola et al. in Chemical Communications, page 1110 (1970), as follows. A one liter photochemical reaction vessel is fitted with a 450 watt Hanovia high pressure mercury vapor lamp, pyrex filter, an air inlet tube and a stirrer. The vessel is filled with a solution of 100 grams of mono-N-vinyl carbazole (from Borden Chemicals) in 500 ml of acetone. The solution is then irradiated for about 10 minutes at room temperature with a moderate flow of air through the solution. After 10 minutes a precipitate of 1, 2-dicarbazolyl cyclobutane begins to appear and with continued irradiation and bubbling of air through the solution the reaction is completed in about 30 minutes. The precipitate is filtered and rinsed with methanol and if desired it can be recrystallized from acetone. The precipitate is practically pure dicarbazolyl cyclobutane (melting point 196°C.) and the yield is about 70 to 80 percent based on the weight of mono-N-vinyl carbazole. While 1, 2-dicarbazolyl cyclobutane has been described, any isomeric configuration of dicarbazolyl cyclobutane can be used.

The electron acceptor may be any suitable Lewis acid and the preferred group of Lewis acids are 2, 4, 7-trinitro-9-fluorenone; 2, 4, 5, 7-tetranitro-9-fluorenone; 2, 6-dichloro-p-benzoquinone; 2, 5-dinitro-9-fluorenone; 1, 5-dichloro-2, 4-dinitrobenzene; 2, 5-dichloro-p-benzoquinone 2, 3, 6-trichloro-p-benzoquinone; 2-chloro-3, 5-dinitropyridine; 2, 4, 5, 7, 9-pentanitroindene; 2, 1-alpha 7-fluorene-11, 12-dione; 2, 5-diphenyl-p-benzoquinone; 2, 3-dichloro-1, 4-naphthoquinone; 9-dicyanomethylene and 2, 4, 7-trinitrofluorene. Of these the most preferred are 2, 4, 7-trinitro-9-fluorenone and 2, 4, 5, 7-tetranitro-9-fluorenone. These two electron acceptors give substantially increased electrophotographic speed over those listed above or with respect to Lewis acids in general.

Other Lewis acids are: quinones, such as p-benzoquinone, naphthoquinone-(1,4), 2,3-dichloronaphthoquinone-(1,4), anthraquinone, 2-methyl-anthraquinone, 1,4-dimethylanthraquinone, 1-chloroanthraquinone, anthraquinone-2-carboxylic acid, 1,5-dichloroanthraquinone, 1-chloro-4-nitroanthraquinone, phenanthrenequinone, acenaphthenequinone, pyranthrenequinone, chrysenequinone, thionaphthenequinone, anthraquinone-1,8-disulfonic acid and anthraquinone-2-aldehyde; triphthaloylbenzene-aldehydes such as bromal, 4-nitrobenzaldehyde, 2,6-dichlorobenzaldehyde-9, 2-ethoxy-1-naphthaldehyde, anthracene-9-aldehyde, pyrene-3-aldehyde, pyrene-3-aldehyde, oxindole-3-aldehyde, pyridine-2,6-dialdehyde, biphenyl-4-aldehyde; organic phosphonic acid such as 4-chloro-3-nitrobenzenephosphonic acid, nitrophenols, such as 4-nitrophenol, and picric acid; acid anhydrides, for example, acetic-anhydride, succinic anhydride, maleic anhydride, phthalic anhydride, tetrachlorophthalic anhydride, perylene-3,4,9,10-tetracarboxylic acid and chrysene-2,3,8,9-tetracarboxylic anhydride, di-bromo maleic acid anhydride, metal halides of the metals and metalloids of the groups IB, II through to group VIII of the periodical system, for example: aluminum chloride, zinc chloride, ferric chloride, tin tetrachloride, (stannic chloride), arsenic trichloride, stannous chloride, antimony pentachloride, magnesium chloride, magnesium bromide, calcium bromide, calcium iodide, strontium bromide, chromic bromide, manganous chloride, cobaltous chloride, cobaltic chloride, cupric bromide, ceric chloride, thorium chloride, arsenci tri-iodide; boron halide compounds, for example: boron trifluoride, and boron trichloride; and ketones, such as acetophenone, benzophenone, 2-acetylnaphthalene, benzil, benzoin, 5-benzoyl acenaphthene, biacene-dione, 9-acetyl-antrhacene, 9-benzoyl-anthracene, 4-(4-dimethyl-amino-cinnamyl)-1-acetylbenzene, acetoacetic acid anilide, indandione-(1,3), 1,3-diketohydrindene, acenaphthene quinonedichloride, anisil, 2,2-pyridil and furil.

Additional Lewis acids are mineral acids such as the hydrogen halides, sulphuric acid and phosphoric acid; organic carboxylic acids, such as acetic acid and the substitution products thereof, monochloro-acetic acid, dichloroacetic acid, trichloro-acetic acid, phenylacetic acid, and 6-methylcoumarinylacetic acid (4); maleic acid, cinnamic acid, benzoic acid, 1-(4-diethyl-amino-benzoyl)-benzene-2-carboxylic acid, phthalic acid, and tetra-chlorophthalic acid, alpha-beta-dibromo-beta-formyl-acrylic acid (mucobromic acid), dibromo-maleic acid, 2-bromo-benzoic acid, gallic acid, 3-nitro-2-hydroxyl-1-benzoic acid, 2-nitro phenoxy-acetic acid, 2-nitro-benzoic acid, 4-nitro-benzoic acid, 3-nitro-4-ethoxy-benzoic acid, 2-chloro-4-nitro-1-benzoic acid, 3-nitro-4-methoxy-benzoic acid, 4-nitro-1-methyl-benzoic acid, 2-chloro-5-nitro-1-benzoic acid, 3-chloro-6-nitro-1-benzoic acid, 4-chloro-3-nitro-1-benzoic acid, 5-chloro-3-nitro-2-hydrozybenzoic acid, 4-chloro-2-hydroxy-benzoic acid, 2,4-dinitro-1-benzoic acid, 2-bromo-5-nitro-benzoic acid, 4-chlorophenyl-acetic acid, 2-chloro-cinnamic acid, 2-cyanocinnamic acid, 2,4-dichlorobenzoic acid, 3,5-dinitro-benzoic acid 3,5-dinitro-salicyclic acid, malonic acid, mucic acid, acetosalicylic acid, benzilic acid, butane-tetra-carboxylic acid, citric acid, cyanoacetic acid, cyclo-hexane-dicarboxylic acid, cyclohexanecarboxylic acid, 9,10-dichloro-stearic acid, fumaric acid, itaconic acid, levulinic acid (levulic acid), malic acid, succinic acid, alpha-bromo-stearic acid, citraconic acid, dibromo-succinic acid, pyrene-2,3,7,8-tetra-carboxylic acid, tartaric acid; organic sulphonic acids, such as 4-toluene sulphonic aacid, and benzene sulphonic acid, 2,4-dinitro-1-methyl-benzene-6-sulphonic acid, 2,6-dinitro-1-hydroxy-benzene-4-sulphonic acid, 2-nitro-1-hydroxy-benzene-4-sulphonic acid, 4-nitro-hydroxy-2-benzene sulphonic acid, 3-nitro-2-methyl-1-hydroxy-benzene-5-sulphonic acid, 6-nitro-4-methyl-1-hydroxy-benzene-2-sulphonic acid, 4-chloro-1-hydroxy-benzene-3-sulphonic acid, 2-chloro-3-nitro-1-methyl-benzene-5-sulphonic acid and 2-chloro-1-methyl-benzene-4-sulphonic acid.

The following examples are illustrative of the photoconductive electrically insulating composition and an electrophotographic member made therefrom.

EXAMPLE I

A one-half molar mixture of DCC and TNF was prepared by mixing 2 g ($5.18 \times 10^{-2}$ mole) of DCC in 10 ml of tetrahydrofuran (THF) and 3.26 g ($1.03 \times 10^{-2}$ mole) of TNF in 18 ml of THF.

A 0.25 mil coating cast onto an electrically conductive substrate from the solution was perfectly amorphous even after curing. It had a charge acceptance of 800 volts and 1.5 seconds of exposure to a 1 foot candle light source was necessary to reduce it by half ($t\ \frac{1}{2}$ = 1.5 foot candle second (fcs)).

EXAMPLE II

The procedure of Example I was repeated except that 0.5 g ($2.7 \times 10^{-3}$ mole monomeric unit) (8.7 percent by weight of solid) of poly-N-vinyl carbazole (Luvican M170, B A S F, molecular weight + 775,000) was added to the solution. This solution had a viscosity of 5.5 cps and a 0.4 mil coating coated from it using a doctor blade set at a 1.5 mil gap, was found to have a charge acceptance of 1000 volts and a $t\ \frac{1}{2} = 1.5$ fcs.

From this coating more than 4000 copies of good quality were produced on a commerical photocopier.

EXAMPLE III

The procedure of Example I was followed except that a solution of 6.52 g ($2.07 \times 10^{-2}$ mole) of TNF in 35 ml of THF was used. This solution corresponded to a DCC/TNF molar ratio of one-fourth. Coatings made from it were amorphous even after curing and had a photoresponse similar to that of Example I or II.

EXAMPLE IV

To a solution of 2 grams (gm) ($1.035 \times 10^{-2}$ mole carbazolyl unit) of poly-N-vinyl carbazole in 20 milliliters (ml) of tetrahydrofuran, is added 4.8 gm ($1,525 \times 10^{-2}$ mole) of 2, 4, 7-trinitro-9-fluorenone with 5 ml of tetrahydrofuran. After stirring for 15 minutes, the solution is divided into two parts. Part A is used as a reference solution. To part B is added 0.34 g ($0.088 \times 10^{-2}$ mole) (4.8 percent by weight) of dicarbazolyl cyclobutane. With a doctor blade set at a 2 mil gap, solutions A and B were coated on a 3 mil aluminized Mylar sheet. The coatings produced from the A solution showed crystallization almost immediately upon curing in an oven at 70°C. The coatings produced from the B solution stayed amorphous even after extensive curing. The molar ratio of poly-N-vinyl carbazole/trinitrofluorenone/dicarbazolyl cyclobutane in solution A was 1/1.47/0 and in solution B was 1/1.47/0.085 well above the crystallization point as indicated in the Shattuck et al. Pat. No. 3,484,237.

EXAMPLE V

Two grams of DCC ($5.18 \times 10^{-3}$ mole) and 2.445 grams of TNF ($7.761 \times 10^{-3}$ mole) were dissolved in 23.5 ml of tetrahydrofuran. 0.423 grams of NVK ($2.191 \times 10^{-3}$ monomeric unit) was then added to the solution to provide a mole ratio of DCC to TNF of 1:1.5 with the NVK making up 8.7 percent of the solids by weight. The solution was then coated onto an electrically conductive substrate to a thickness of about 0.3 mil and remained completely amorphous even after curing. The coating had a charge acceptance of about 1,000 volts and an electrophotographic speed of ($t\ \frac{1}{2}$) 1.7 fcs.

EXAMPLE VI

Two grams of DCC ($5.18 \times 10^{-3}$ mole) and 3.26 grams of TNF ($10.349 \times 10^{-3}$ mole) were dissolved in 28 ml of tetrahydrofuran. To the solution was added 0.501 grams of NVK ($2.595 \times 10^{-3}$ monomeric unit) to provide a composition having a mole ratio of DCC to TNF of 1:2 with the NVK making up 8.7 percent of the solids by weight. This composition was coated onto an electrically conducting substrate to a thickness of about 0.3 mil and was found to have a charge acceptance of about 1,000 volts with electrophotographic speed of ($t\ \frac{1}{2}$) 1.35 — 1.5 fcs.

EXAMPLE VII

Two grams of DCC ($5.18 \times 10^{-3}$ mole) and 4.89 grams TNF ($15.524 \times 10^{-3}$ mole) were dissolved in 37 ml of THF. To the solution was added 0.656 grams of NVK ($3.398 \times 10^{-3}$ monomeric unit) to provide a mole ratio of DCC to TNF of 1:3 with the NVK making up 8.7 percent of the composition by weight of solids. The composition was then coated onto electrically conducting substrate to a thickness of about 0.3 mil was found to have a charge acceptance of about 1,000 volts and an electrophotographic speed of ($t\ \frac{1}{2}$) 1.3 fcs.

EXAMPLE VIII

Two grams of DCC ($5.18 \times 10^{-3}$ mole) and 6.52 grams TNF ($20.698 \times 10^{-3}$ mole) were dissolved in 46 ml of THF. To the solution was added 0.811 grams of NVK ($4.202 \times 10^{-3}$ mole) to provide a mole ratio of DCC to TNF of 1:4 with the NVK making up 8.7 percent of the composition by weight of solids. The composition was then coated onto an electrically conducting substrate to a thickness of about 0.3 mil and was found to have an electrophotographic speed of ($t\ \frac{1}{2}$) 1.2 fcs.

EXAMPLE IX

Two grams of DCC ($5.18 \times 10^{-3}$ mole) and 7.334 grams TNF ($23.3 \times 10^{-3}$ mole) were dissolved in 50 ml of THF. To the solution was then added 0.89 grams of NVK ($4.6 \times 10^{-3}$ monomeric units) to provide a mole ratio of DCC to TNF of 1:4.5 with the NVK making up 8.5 percent of the composition by weight of solids. The composition when coated onto an electrically conducting substrate was found to have a charge acceptance of about 1,000 volts with an electrophotographic speed of ($t\ \frac{1}{2}$) 1 fcs.

A larger formulation was made having a mole ratio of DCC to TNF of 1:4.5 with NVK making up 8.7 percent of the composition by weight of solids and was coated onto a 3 mil aluminized Mylar sheet to a thickness of about 0.3 – 0.4 mil and cured to form an electrophotographic member. The electrophotographic member was then placed in a commercial xerographic copier and 6200 copies of excellent quality were produced. Even after 6000 copies there was less background developed on the copies than that experienced with commerically available xerographic plates where background generally develops between 4000 and 5000 copies.

EXAMPLE X

Two grams of DCC ($5.18 \times 10^{-3}$ mole) and 8.15 grams of TNF ($25.9 \times 10^{-3}$ mole) were dissolved in 55 ml of THF. To the solution was then added 0.97 grams of NVK ($5.02 \times 10^{-3}$ mole) to provide a mole ratio of DCC to TNF of 1:5 with the NVK making up 8.7 percent of the composition by weight of solids. The composition was then coated onto an electrically conducting substrate and cured. It was found to have a voltage acceptance of about 1,000 volts and an electrophotographic speed of ($t$ ½) 0.9 to 1 fcs. It has been found that at ratios of DCC to TNF greater than 1:5, crystallization begins to occur. Accordingly, the 1:5 ratio of DCC to TNF is preferred as an upper limit.

The foregoing Examples demonstrate that the three component composition of DCC, TNF and NVK provide an excellent photoconductive insulating composition which will remain amorphous even with extended or high temperature curing, and that at mole ratios of DCC to TNF of greater than 1:2 the electrophotographic speed of the composition markedly increases.

While because of the coloration of the resulting composition dye sensitization may not be required, increased speed and/or spectral response may be improved with dye sensitization. Typical dyes which may be used are: Triarylmethane dyes, Xanthene dyes such as Rhodamines and Phthaleins, Thiazine dyes, Acridine dyes, Quinoline dhyes, Quinone dyes, Ketone dyes such as Alizarins and Quinizarin, Cyanine dyes and Chlorophyll.

One or more additional binders may also be used to improve adhesion of the composition to a substrate or to increase strength, wear or other qualities. The amount of additional binder should not exceed 15 percent by weight of the composition.

It is also contemplated that more than one electron acceptor as set forth above may be employed in the composition. For example, a combination of trinitrofluorenone and tetranitrofluorenone may be used with tetranitrofluorenone being used in a minor amount to increase the range of spectral response.

It has also been found that while it is preferable to first dissolve the DCC and TNF and then add the NVK later, there is no material difference in the electrophotographic performance of the composition when the order of addition is changed.

It will thus be seen that the objects set forth above, among those made apparent from the preceding description, are efficiently attained and, since certain changes may be made in the above composition and electrophotographic member without departing from the scope of the invention, it is intended that all matter contained in the above description shall be interpreted as illustrative and not in a limiting sense.

What is claimed is:

1. A photoconductive electrically insulating composition comprising a charge transfer complex of a dicarbazolyl compound of the formula:

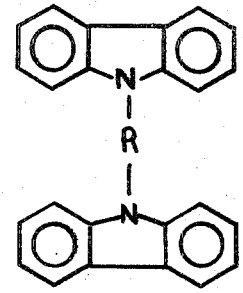

wherein R is a cycloalkyl group, with a Lewis acid selected from the group consisting of 2,4,7-trinitro-9-fluorenone and 2,4,5,7-tetranitro-9-fluorenone, the mole ratio of dicarbazolyl compound to Lewis acid being from about 1:0.5 to 1:5, and from 5 to 50 percent by weight of a polymer selected from the group consisting of poly-N-vinyl carbazole and a halogenated poly-N-vinyl carbazole.

2. The composition of claim 1 wherein said dicarbazolyl compound is dicarbazolyl cyclobutane.

3. The composition defined in claim 1 and further including a dyestuff sensitizer.

4. A photoconductive electrically insulating composition comprising a charge transfer complex of dicarbazolyl cyclobutane and 2, 4, 7-trinitro-9-fluorenone in a mole ratio of from about 1:2 to 1:5 and form 5 to 50 percent by weight of a polymer taken from the group consisting of poly-N-vinyl carbazole and halogenated poly-N-vinyl carbazole.

5. The composition defined in claim 4 wherein the mole ratio of dicarbazolylcyclobutane to trinitrofluorenone is from 1:3.5 to 1:5 and said polymer comprises from 5 to 13 percent by weight of the composition.

6. The composition defined in claim 4 and further including a dyestuff sensitizer.

7. An electrophotographic member comprising an electrically conductive layer having thereon a photoconductive insulating layer, said photoconductive layer comprising a charge transfer complex of dicarbazolyl cyclobutane and 2, 4, 7-trinitro-9-fluorenone in a mole ratio of from about 1:2 to 1:5 and from 5 to 50 percent by weight of a polymer taken from the group consisting of poly-N-vinyl carbazole and halogenated poly-N-vinyl carbazole.

8. The composition defined in claim 7 wherein the mole ratio of DCC to TNF is from 1:3.5 to 1:5 and the polymer comprises from 5 to 13 percent of the photoconductive insulating layer by weight.

* * * * *